United States Patent
Ikemi et al.

(10) Patent No.: US 11,843,282 B2
(45) Date of Patent: Dec. 12, 2023

(54) ROTOR FOR ELECTRIC MOTOR, AND ELECTRIC MOTOR

(71) Applicant: MITSUBISHI HEAVY INDUSTRIES, LTD., Tokyo (JP)

(72) Inventors: Takeshi Ikemi, Tokyo (JP); Shinichi Isobe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 30 days.

(21) Appl. No.: 17/695,005

(22) Filed: Mar. 15, 2022

(65) Prior Publication Data

US 2022/0320923 A1   Oct. 6, 2022

(30) Foreign Application Priority Data

Mar. 31, 2021   (JP) ................. 2021-060548

(51) Int. Cl.
*H02K 1/26*      (2006.01)
*H02K 3/48*      (2006.01)
*H02K 3/12*      (2006.01)
*H02K 1/2791*    (2022.01)

(52) U.S. Cl.
CPC ........... *H02K 1/265* (2013.01); *H02K 1/2791* (2022.01); *H02K 3/12* (2013.01); *H02K 3/48* (2013.01)

(58) Field of Classification Search
CPC ........ H02K 1/265; H02K 1/2791; H02K 3/12; H02K 3/48; H02K 21/16; H02K 1/2733; H02K 2213/03
See application file for complete search history.

(56) References Cited

U.S. PATENT DOCUMENTS

| | | | | |
|---|---|---|---|---|
| 5,397,951 A | * | 3/1995 | Uchida | H02K 1/278 310/91 |
| 2013/0342066 A1 | * | 12/2013 | Taniguchi | H02K 15/03 310/156.28 |
| 2018/0233977 A1 | * | 8/2018 | Volkmuth | H02K 9/197 |
| 2019/0229597 A1 | * | 7/2019 | Büttner | H02K 15/0012 |
| 2022/0320923 A1 | * | 10/2022 | Ikemi | H02K 1/265 |

FOREIGN PATENT DOCUMENTS

| | | | |
|---|---|---|---|
| JP | H0678481 | * | 3/1994 |
| JP | 2001-339886 | | 12/2001 |
| JP | 2005-192617 | | 7/2005 |
| JP | 4259548 | | 4/2009 |
| WO | 2008/012637 | | 1/2008 |

* cited by examiner

*Primary Examiner* — Ahmed Elnakib
(74) *Attorney, Agent, or Firm* — Wenderoth, Lind & Ponack, L.L.P.

(57) ABSTRACT

A rotor for an electric motor includes: a rotating element extending along an axis; and a retaining body formed of metal and configured to hold the rotating element from an outer peripheral side, where the retaining body includes: a plurality of annular members annularly surrounding an outer peripheral surface of the rotating element and arranged at intervals in the axis direction; and a plurality of connecting members arranged in a circumferential direction between the annular members adjacent to each other so as to connect the annular members. As a result, a path of eddy current is limited and the eddy current can be reduced.

11 Claims, 8 Drawing Sheets

ROTOR FOR ELECTRIC MOTOR, AND ELECTRIC MOTOR

CROSS-REFERENCE TO RELATED APPLICATIONS

This application claims the benefit of priority to Japanese Patent Application Number 2021-060548 filed on Mar. 31, 2021. The entire contents of the above-identified application are hereby incorporated by reference.

TECHNICAL FIELD

The disclosure relates to a rotor for an electric motor, and an electric motor.

RELATED ART

As one type of an electric motor, a motor in which a cylindrical magnet is mounted on a surface of a rotating element is known. In this type of motor, in order to prevent a magnet from being damaged by a centrifugal force of high rotation, a retaining ring (retaining body) formed of Inconel or titanium is attached to an outer peripheral side of the magnet (for example, see JP 2001-339886 A).

SUMMARY

However, since the retaining body is formed of metal, which is a conductor, eddy current is formed on the surface of the retaining body due to a change in magnetic flux generated between the retaining body and a stator. When eddy current is generated, there is a possibility of leading to loss as an electric motor.

The disclosure has been made to solve the above-described problems, and an object of the disclosure is to provide a rotor for an electric motor and an electric motor, which further suppress generation of eddy current.

In order to solve the above-described problem, a rotor for an electric motor according to the disclosure includes: a rotating element extending along an axis; and a retaining body formed of metal and configured to hold the rotating element from an outer peripheral side, wherein the retaining body includes: a plurality of annular members annularly surrounding an outer peripheral surface of the rotating element and arranged at intervals in an axis direction; and a plurality of connecting members arranged in a circumferential direction between the annular members adjacent to each other so as to connect the annular members.

According to the disclosure, it is possible to provide a rotor for an electric motor and an electric motor, which further suppress generation of eddy current.

BRIEF DESCRIPTION OF DRAWINGS

The disclosure will be described with reference to the accompanying drawings, wherein like numbers reference like elements.

DESCRIPTION OF EMBODIMENTS

First Embodiment

Configuration of Electric Motor

Figure 1:
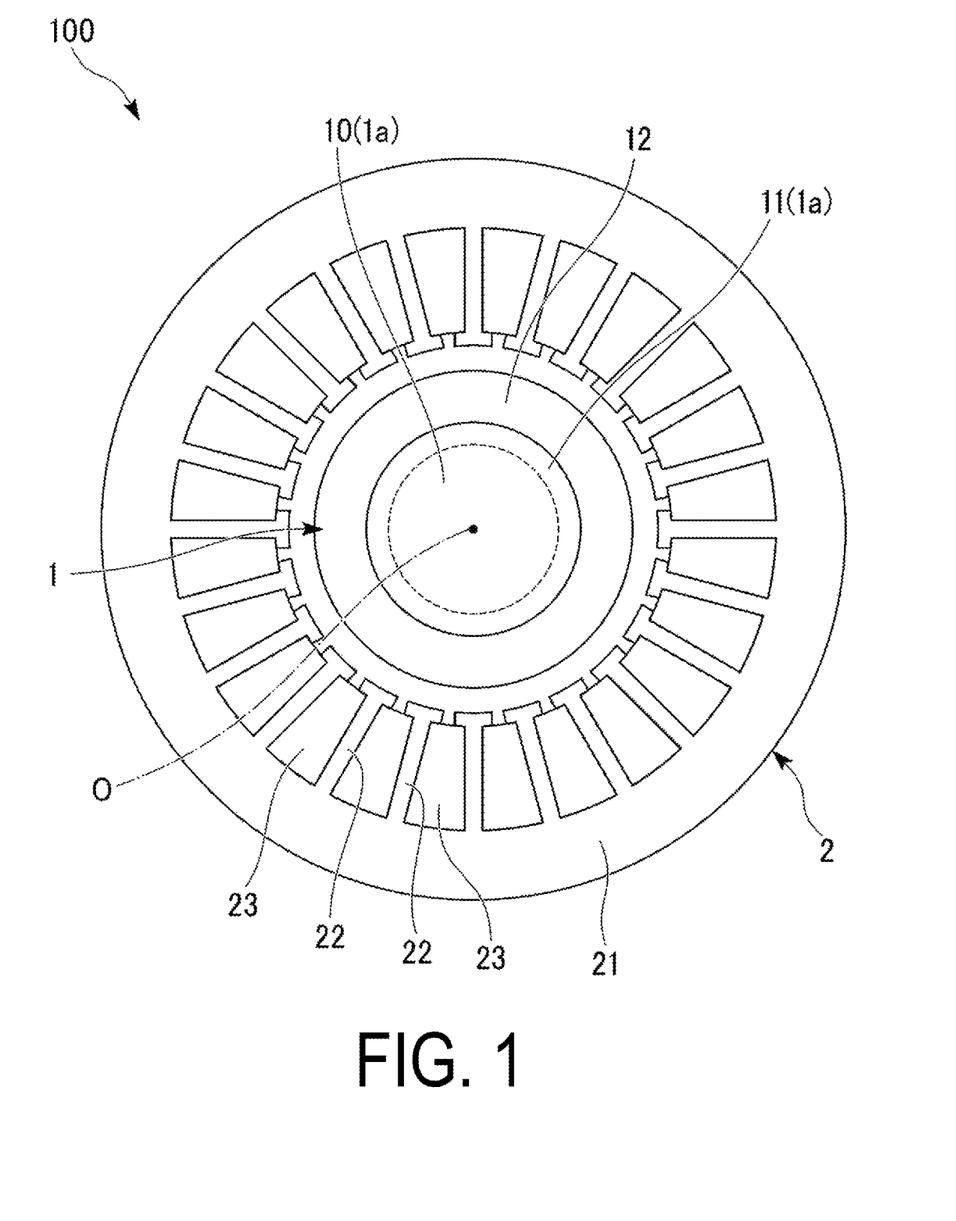
FIG. 1 is a cross-sectional view illustrating a configuration of an electric motor according to a first embodiment of the disclosure.

Hereinafter, an electric motor 100 according to a first embodiment of the disclosure will be described with reference to FIGS. 1 to 6. As illustrated in FIG. 1, the electric motor 100 includes a rotor 1 (rotor for an electric motor) and a stator 2. The rotor 1 has a columnar shape extending along an axis O. The stator 2 has a cylindrical shape covering the rotor 1 from the outer peripheral side. The rotor 1 is rotatable around the axis O on the inner peripheral side of the stator 2.

Configuration of Rotor

The rotor 1 includes a rotating element 1a and a retaining body 12. The rotating element 1a includes a shaft 10 and a magnet 11. The shaft 10 extends along the axis O. The magnet 11 forms a cylindrical shape covering this shaft 10 from the outer peripheral side. The magnet 11 is integrally formed of, for example, a ferrite magnet or a neodymium magnet.

Figure 2:
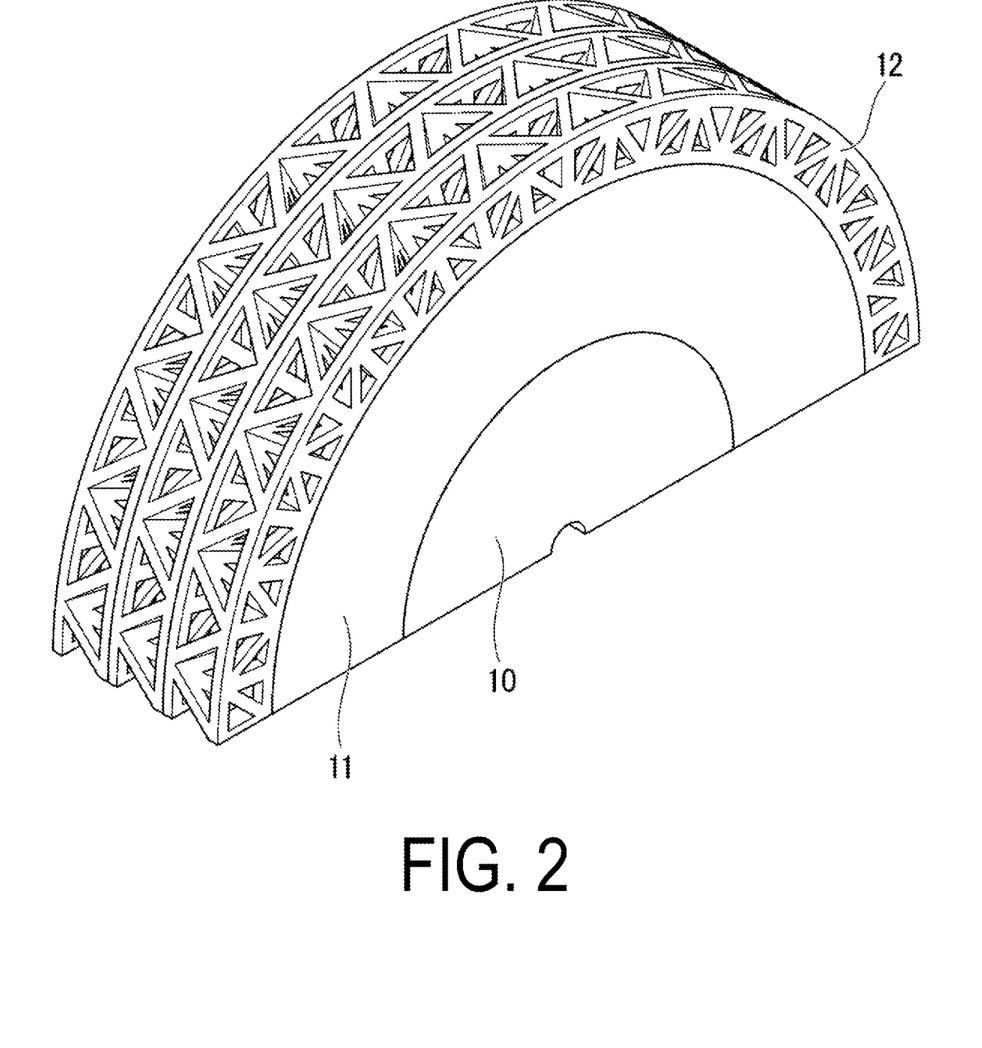
FIG. 2 is a perspective view illustrating a configuration of a rotor for an electric motor according to the first embodiment of the disclosure.
Figure 3:
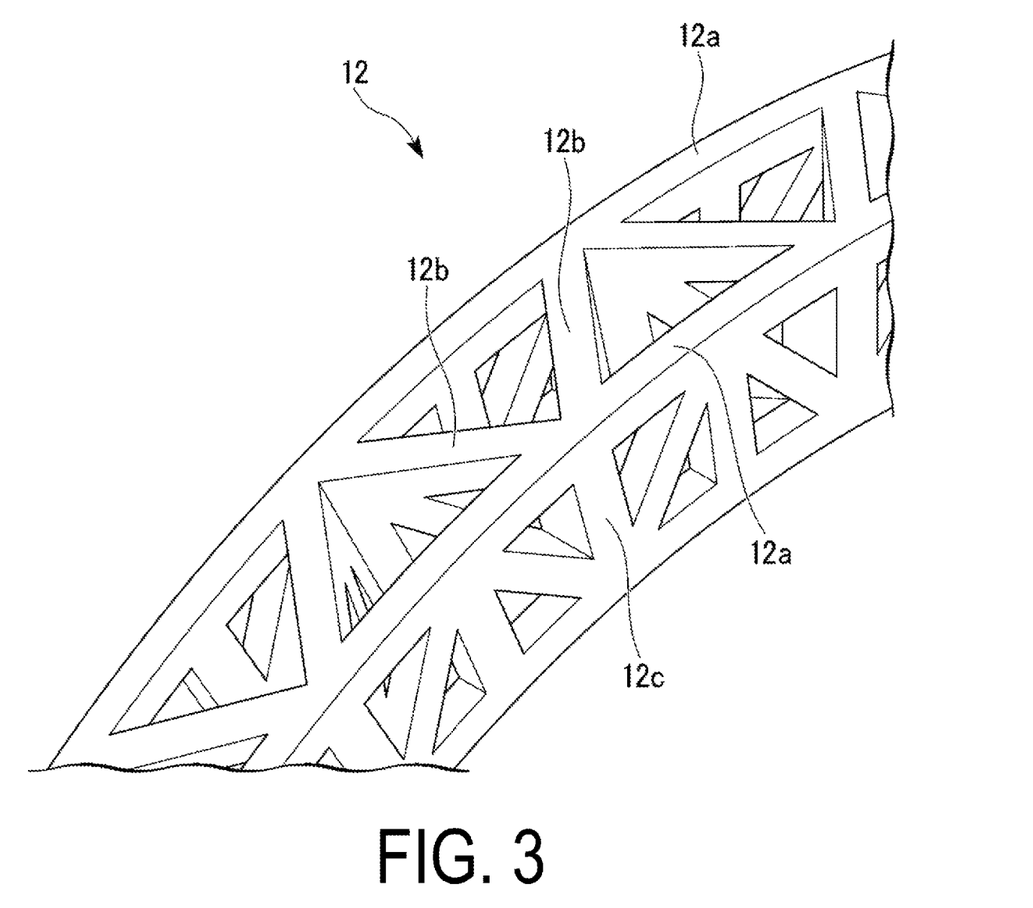
FIG. 3 is an enlarged perspective view illustrating a configuration of a retaining body according to the first embodiment of the disclosure.

The retaining body 12 is provided to prevent the magnet 11 from being scattered from the shaft 10. The retaining body 12 forms a cylindrical shape covering the magnet 11 from the outer peripheral side. As illustrated in FIGS. 2 and 3, the retaining body 12 forms a truss. More specifically, as illustrated in FIG. 3, the retaining body 12 includes an annular member 12a, a connecting member 12b, and a support member 12c.

The annular member 12a surrounds the outer peripheral surface of the rotating element 1a and forms an annular shape around the axis O. In addition, a plurality of such annular members 12a are disposed at intervals in the axis O direction. The connecting member 12b connects a pair of the annular members 12a adjacent to each other, and a plurality of the connecting members 12b are arranged at an interval in the circumferential direction. Specifically, each connecting member 12b extends in the circumferential direction from one side of the axis O direction toward the other side, thereby inclined with respect to the axis O.

In addition, in the present embodiment, a pair of the connecting members 12b adjacent to each other extend so as to be separated from each other in a circumferential direction from one side of the axis O direction toward the other side. An angle θ2 (see FIG. 5) formed by the connecting member 12b with respect to the axis O is in a range of 0° to 45°. For example, a case where θ2 is 0° refers to a case where a connecting member 12b extends in the axis O direction, unlike the present embodiment. As will be described later in detail, the value of θ2 satisfies θ2>½ θ1 in relation to an inter-slot angle θ1 of the stator 2.

The annular member 12a and the connecting member 12b are supported by the support member 12c from the inner peripheral side. The support member 12c also forms a truss. Such a retaining body 12 is integrally formed as a whole by additive manufacturing of a metal material using an additive manufacturing (AM) shaping method. Note that the layering direction in additive manufacturing is desirably the axis O direction.

Configuration of Stator

Next, the configuration of the stator 2 will be described with reference to FIGS. 1 and 4. The stator 2 includes a stator core 21, teeth 22, and a coil 23. The stator core 21 has a cylindrical shape covering the rotor 1 from the outer peripheral side. Although not illustrated in detail, the stator core 21 is formed into a cylindrical shape as a whole by laminating a plurality of layers of thin plate steel plates in the axis O direction. A plurality of teeth 22 are provided on an inner peripheral surface of the stator core 21. The teeth 22 protrude radially inward in a radial direction from the stator core 21, and are arranged in plurality at intervals in the circumferential direction. The coil 23 is attached to each of the teeth 22. The coil 23 is formed by winding copper wires around each of the teeth 22 multiple times. By energizing the coil 23, a magnetic field is generated, and an electromagnetic force is generated between the magnetic field and the magnet 11 of the rotor 1. This electromagnetic force allows the rotor 1 to rotate on the inner peripheral side of the stator 2.

Figure 4:
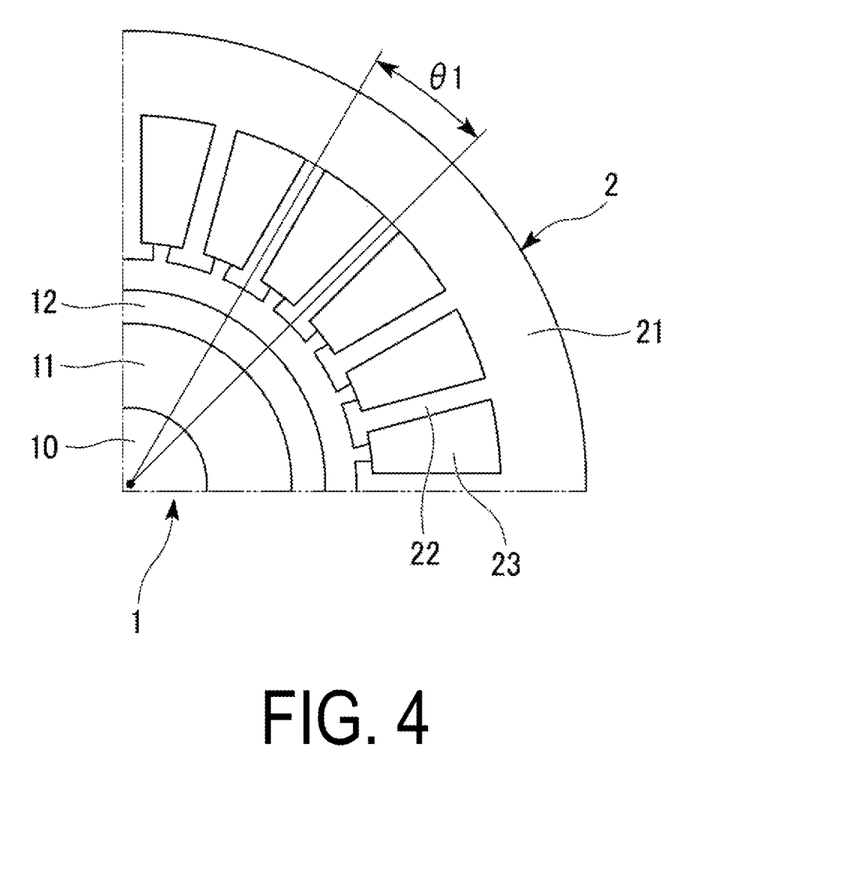
FIG. 4 is an enlarged cross-sectional view of a main portion of the electric motor according to the first embodiment of the disclosure.
Figure 5:
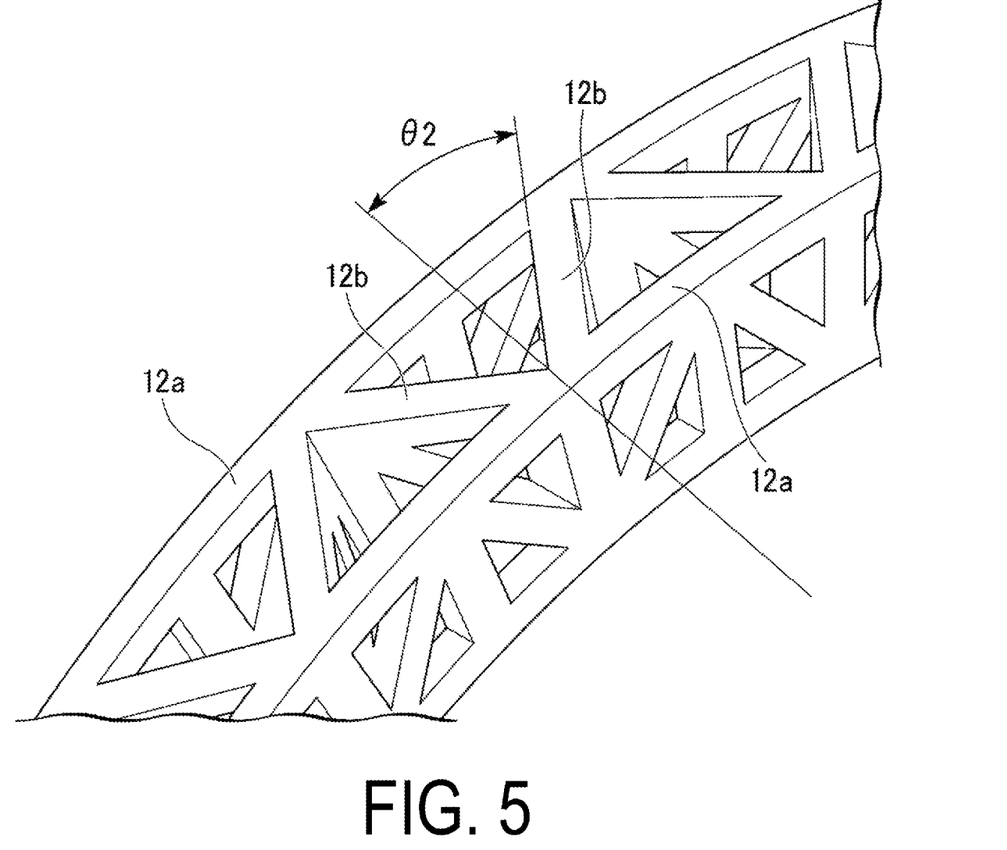
FIG. 5 is an enlarged view of a main portion of the retaining body according to the first embodiment of the disclosure.

As illustrated in FIG. 4, an angle between a pair of teeth 22 adjacent to each other is θ1. At this time, as described above, the angle θ2 formed by the connecting member 12b with respect to the axis O is determined based on the value of θ1.

Operational Effects

Next, an operation of the electric motor 100 will be described. To operate the electric motor 100, current is first supplied to the coil 23. A magnetic field is thereby formed around the coil 23. The interaction between this magnetic field and the magnetic field generated by the magnet 11 of the rotor 1 gives the rotor 1 an electromagnetic force in the circumferential direction of the axis O. As a result, the rotor 1 rotates around the axis O.

Here, in this type of electric motor 100, the retaining body 12 is attached to an outer peripheral side of the magnet 11 in order to prevent the magnet 11 from being damaged by a centrifugal force of high rotation. When the retaining body 12 is formed of, for example, a solid metal member, eddy current is formed on the surface of the retaining body 12 due to change in magnetic flux generated between the retaining body 12 and the stator 2. When eddy current occurs, there is a possibility that it may lead to loss as the electric motor 100.

Figure 6:
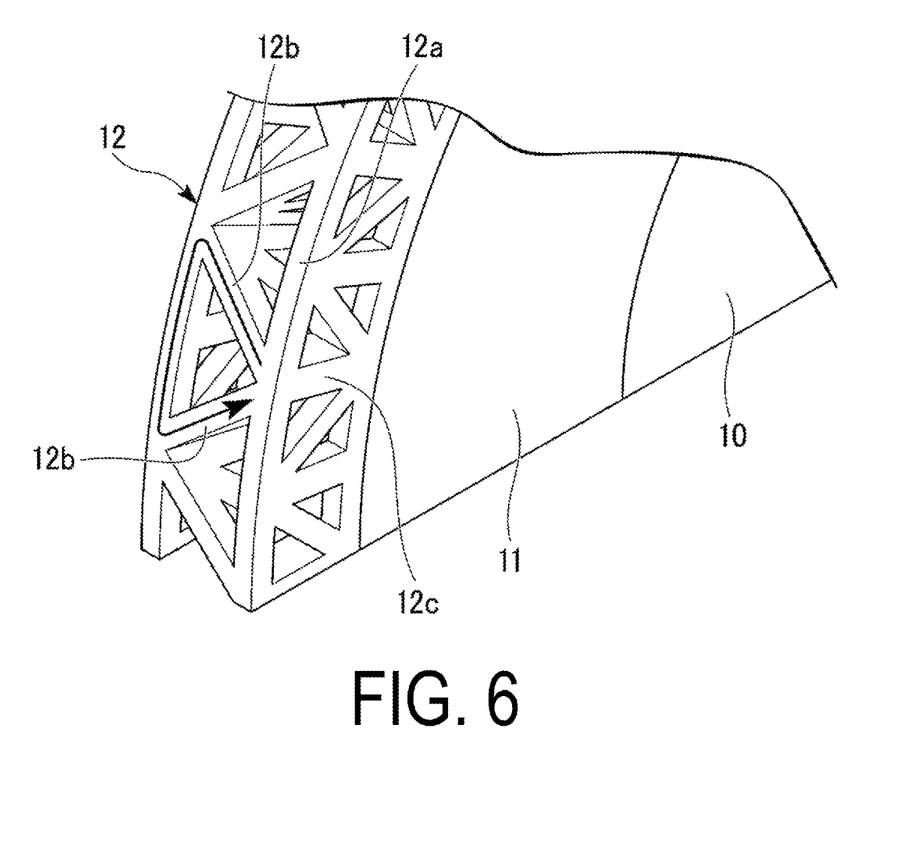
FIG. 6 is an explanatory diagram illustrating a path of eddy current on a surface of the retaining body according to the first embodiment of the disclosure.

Therefore, in the present embodiment, the retaining body 12 forms a truss as described above. Specifically, according to the above configuration, the surface shape of the retaining body 12 forms a truss formed by the annular member 12a and the connecting member 12b. As a result, as illustrated in FIG. 6, the path of eddy current generated by a change in magnetic flux can be limited to a shape along the truss (a triangular shape path). That is, eddy current can be localized and its magnitude can be further reduced as compared with the case where the surface of the retaining body 12 is flat. Further, since the retaining body 12 forms a truss, it is possible to increase the structural strength of the retaining body 12. As a result, the electric motor 100 can be operated more stably and efficiently.

Further, in the present embodiment, the connecting member 12b is inclined with respect to the axis O so as to extend toward the circumferential direction as it extends toward the axis O direction.

According to the above-described configuration, since the connecting member 12b extends so as to be inclined with respect to the axis O, the isotropy of the eddy current is reduced. As a result, the loss due to eddy current can be further reduced. On the other hand, for example, in a case where the connecting member 12b is not inclined with respect to the axis O, the path of eddy current has a rectangular shape, and as a result of the eddy currents of a plurality of paths being superimposed, there is a possibility that a larger eddy current is generated. However, according to the above-described configuration, since the paths of the triangular shape are independent of each other, it is possible to reduce the possibility of generating a large eddy current.

In addition, in the present embodiment, a pair of the connecting members 12b adjacent to each other extend so as to be separated in the circumferential direction from one side of the axis O direction toward the other side.

According to the above configuration, the isotropy of the eddy current can be further reduced, and the strength of the retaining body 12 can be further increased.

In the present embodiment, when an angle between the teeth 22 adjacent to each other is θ1 and an angle formed by the connecting member 12b with respect to the axis O is θ2, θ2>½ θ1 is satisfied.

According to the above configuration, the angle θ2 formed by the connecting member 12b with respect to the axis O is optimized for the angle θ1 (that is, slot pitch) between the teeth 22. As a result, eddy current flowing through the connecting member 12b can be further reduced.

The first embodiment of the disclosure has been described above. Note that various changes and modifications can be made to the above-described configurations without departing from the gist of the disclosure. For example, in the first embodiment described above, the magnet 11 having a cylindrical shape is provided on the outer peripheral surface of the shaft 10. However, the form of the magnet 11 is not limited to the above, and the retaining body 12 described in the first embodiment can be applied to an embedded rotating element in which a plurality of magnets are embedded inside the shaft 10.

Second Embodiment

Figure 7:
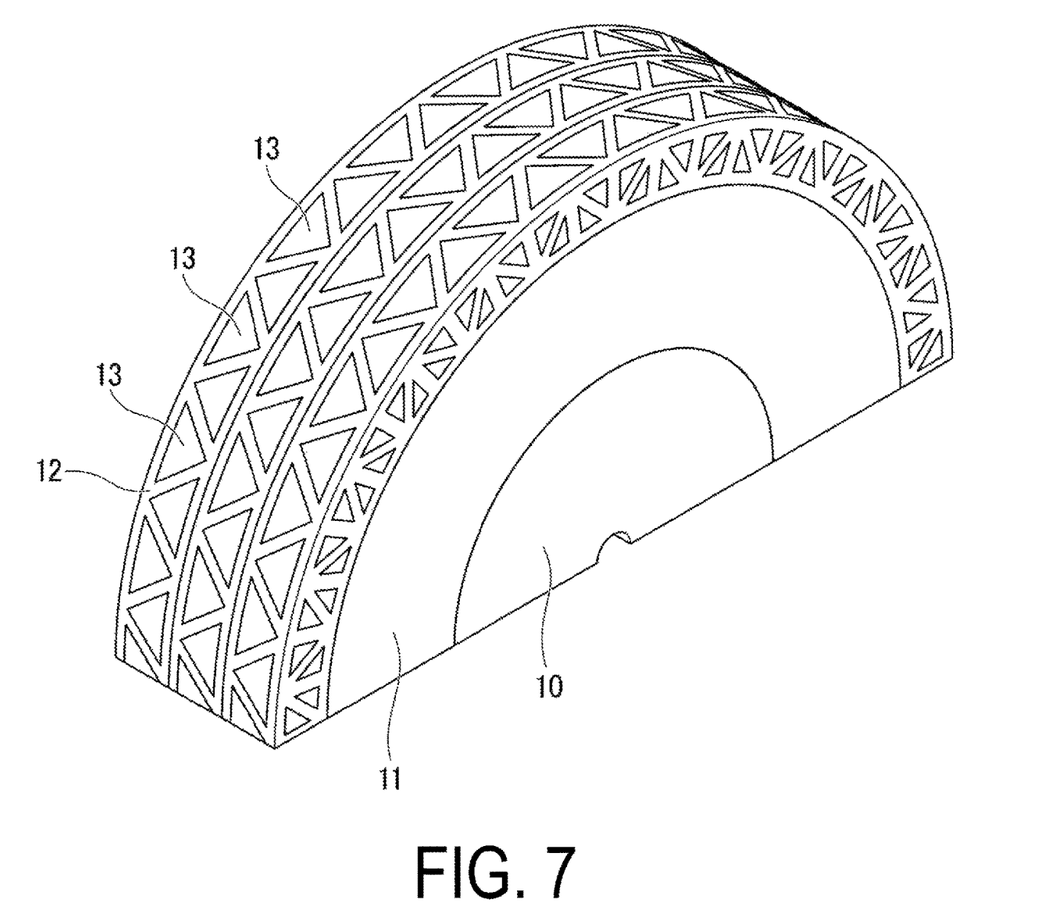
FIG. 7 is a perspective view illustrating a configuration of a rotor for an electric motor according to a second embodiment of the disclosure.

A second embodiment of the disclosure will now be described with reference to FIG. 7. Note that the same components as those of the first embodiment will be denoted by the same reference signs, and a detailed description thereof will be omitted. As illustrated in FIG. 7, in the present embodiment, the configuration of the retaining body 12 is similar to that of the first embodiment. On the other hand, in the present embodiment, the gap formed by the annular member 12a and the connecting member 12b is filled with a small magnet 13. One such small magnet 13 is filled in each of all the gaps. In forming the small magnet 13, additive manufacturing according to the above-described AM shaping method may be performed using two different metal materials, or a bonded magnet may be filled in the gap and then magnetized to form the small magnet 13.

According to the above configuration, since the small magnet 13 is filled in the gap, an electromagnetic force generated between the rotor 1 and the stator 2 is strengthened. As a result, the torque of the electric motor 100 can be improved. In particular, since the small magnets 13 are arranged periodically and evenly in the gaps of the retaining body 12, the electromagnetic force is strengthened uniformly over the entire circumferential direction, and the electric motor 100 can be operated more stably under a high torque.

The second embodiment of the disclosure has been described above. Note that various changes and modifications can be made to the above-described configurations without departing from the gist of the disclosure. For example, as a modification example common to the above-described embodiments, a configuration illustrated in FIG. 8 can be adopted. In the example of the same Figure, an inner peripheral surface 12s of the retaining body 12 having a cylindrical shape forms a cylindrical surface that abuts the rotating element 1a (magnet 11). That is, only the vicinity of the outer peripheral surface of the retaining body 12 forms a truss, while the inner peripheral surface 12s has a continuous planar shape.

In general, the retaining body is fixed to the rotating element by heat-shrink fitting or the like. According to the above configuration, since the inner peripheral surface 12s of the retaining body 12 forms a cylindrical surface, uniform surface contact with the rotating element 1a can be achieved. This can further increase the structural strength of the rotor 1.

Figure 8:
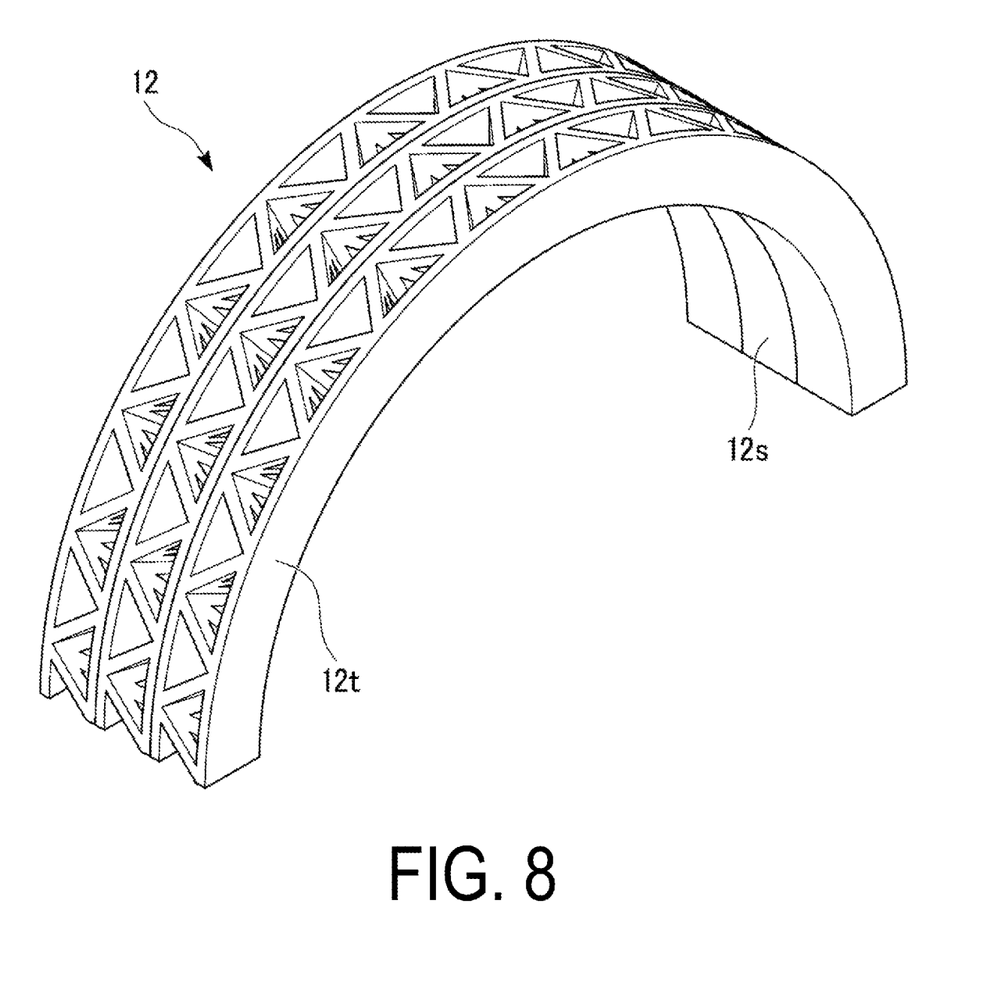
FIG. 8 is a perspective view illustrating a modification example of a retaining body according to the second embodiment of the disclosure.

In the example of FIG. 8, an end face 12t of the retaining body 12, which faces the axis O direction, forms a flat surface extending in a plane orthogonal to the axis O.

Here, it is known that eddy current is less likely to occur in the end face 12t facing the axis O direction of the retaining body 12. Therefore, unlike the above-described embodiments, by setting the end face 12t as a flat surface as in the above-described configuration, it is possible to increase the structural strength of the retaining body 12 without affecting the eddy current reduction effect.

Notes

The rotor for an electric motor (rotor 1) and the electric motor 100 described in each embodiment are grasped as follows, for example.

(1) A rotor for an electric motor according to a first aspect includes: a rotating element 1a extending along an axis O; and a retaining body 12 formed of metal and configured to hold the rotating element 1a from an outer peripheral side, wherein the retaining body 12 includes: a plurality of annular members 12a annularly surrounding an outer peripheral surface of the rotating element 1a and arranged at intervals in an axis O direction; and a plurality of connecting members 12b arranged in a circumferential direction between the annular members 12a adjacent to each other so as to connect the annular members 12a.

According to the above configuration, the surface shape of the retaining body 12 forms a truss formed by the annular member 12a and the connecting member 12b. As a result, the path of eddy current generated by a change in magnetic flux can be limited to a shape along the truss. In other words, eddy current can be reduced as compared with the case where the retaining body 12 is a flat surface. In addition, since the truss is formed, the structural strength of the retaining body 12 can be increased.

(2) In a rotor for an electric motor according to a second aspect, each of the connecting members 12b is inclined with respect to the axis O so as to extend toward the circumferential direction as extending toward the axis O direction.

According to the above-described configuration, since the connecting member 12b extends so as to be inclined with respect to the axis O, the isotropy of the eddy current is reduced. As a result, the loss due to eddy current can be further reduced.

(3) In a rotor for an electric motor according to a third aspect, a pair of the connecting members 12b adjacent to each other extend so as to be separated in the circumferential direction from one side in the axis O direction toward the other side.

According to the above configuration, the isotropy of the eddy current can be further reduced, and the strength of the retaining body 12 can be further increased.

(4) In a rotor for an electric motor according to a fourth aspect, each of the connecting members 12b extends in the axis O direction.

According to the above-described configuration, eddy current can be reduced as compared with the case where the retaining body 12 is a flat surface.

(5) In a rotor for an electric motor according to a fifth aspect, an inner peripheral surface 12s of the retaining body 12 forms a cylindrical surface abutting the rotating element 1a.

In general, the retaining body 12 is fixed to the rotating element 1a by heat-shrink fitting or the like. According to the above configuration, since the inner peripheral surface 12s of the retaining body 12 forms a cylindrical surface, surface contact with the rotating element 1a can be easily achieved. This can further increase the structural strength of the rotor for an electric motor.

(6) In a rotor for an electric motor according to a sixth aspect, an end face 12t, of the retaining body 12, facing the axis O direction forms a flat surface extending in a plane orthogonal to the axis O.

Here, it is known that eddy current is less likely to occur in the end face 12t facing the axis O direction of the retaining body. Therefore, by setting the end face 12t as a flat surface as in the above-described configuration, it is possible to increase the structural strength of the retaining body 12 without affecting the eddy current reduction effect.

(7) A rotor for an electric motor according to a seventh aspect further includes a small magnet 13 filled in a gap formed by the annular member 12a and the connecting member 12b.

According to the above configuration, since the small magnet 13 is filled in the gap, an electromagnetic force generated between the rotor for an electric motor and the stator 2 is strengthened. As a result, the torque of the electric motor 100 can be improved.

(8) An electric motor 100 according to an eighth aspect includes: the rotor for an electric motor described in any one of the above aspects; and a stator 2 including: a stator core 21 having a cylindrical shape and covering the rotor for an electric motor from the outer peripheral side; a plurality of teeth 22 protruding radially inward from an inner peripheral surface of the stator core 21 and arranged at intervals in the circumferential direction; and a coil 23 wound around the teeth 22.

According to the above configuration, it is possible to provide a high efficiency electric motor 100 in which a loss due to eddy current is suppressed.

(9) In the electric motor 100 according to a ninth aspect, when an angle between the teeth 22 adjacent to each other is $\theta 1$ and an angle formed by the connecting members 12b with respect to the axis O is $\theta 2$, $\theta 2 > \frac{1}{2} \theta 1$ is satisfied.

According to the above configuration, the angle $\theta 2$ formed by the connecting member 12b with respect to the axis O is optimized with respect to the angle $\theta 1$ (that is, slot pitch) between the teeth 22. As a result, eddy current flowing through the connecting member 12b can be further reduced.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A rotor for an electric motor, comprising:
a rotating element extending along an axis; and
a retaining body formed of metal and configured to hold the rotating element from an outer peripheral side, wherein:
the retaining body has a truss structure formed of a plurality of annular members and a plurality of connecting members;
the annular members annularly surround an outer peripheral surface of the rotating element and are arranged at intervals in an axial direction; and
the connecting members are arranged in a circumferential direction between the annular members adjacent to each other to connect the annular members.

2. The rotor for an electric motor according to claim 1, wherein
each of the connecting members is inclined with respect to the axis to extend toward the circumferential direction as extending toward the axis direction.

3. The rotor for an electric motor according to claim 2, wherein
a pair of the connecting members adjacent to each other extend to be separated in the circumferential direction from one side in the axis direction toward the other side.

4. The rotor for an electric motor according to claim 1, wherein each of the connecting members extends in the axis direction.

5. The rotor for an electric motor according to claim 1, wherein
an inner peripheral surface of the retaining body forms a cylindrical surface abutting the rotating element.

6. The rotor for an electric motor according to claim 1, wherein
an end face, of the retaining body, facing the axis direction forms a flat surface extending in a plane orthogonal to the axis.

7. The rotor for an electric motor according to claim 1, further comprising:
a magnet filled in a gap formed by the annular members and the connecting members.

8. An electric motor comprising:
the rotor for an electric motor described in claim 1; and
a stator including:
a stator core having a cylindrical shape and covering the rotor for an electric motor from the outer peripheral side;
a plurality of teeth protruding radially inward from an inner peripheral surface of the stator core and arranged at intervals in the circumferential direction; and
a coil wound around the teeth.

9. The electric motor according to claim 8, wherein
when an angle between the teeth adjacent to each other is $\theta 1$ and an angle formed by the connecting members with respect to the axis is $\theta 2 > \frac{1}{2} \theta 1$ is satisfied.

10. The rotor for an electric motor according to claim 1, wherein
the retaining body including the plurality of annular members and the plurality of connecting members is integrally formed as a whole.

11. An electric motor, comprising:
a rotor for an electric motor including:
a rotating element extending along an axis; and
a retaining body formed of metal and configured to hold the rotating element from an outer peripheral side, wherein the retaining body includes:
a plurality of annular members annularly surrounding an outer peripheral surface of the rotating element and arranged at intervals in an axial direction; and
a plurality of connecting members arranged in a circumferential direction between the annular members adjacent to each other to connect the annular members; and
a stator including:
a stator core having a cylindrical shape and covering the rotor for an electric motor from the outer peripheral side;
a plurality of teeth protruding radially inward from an inner peripheral surface of the stator core and arranged at intervals in the circumferential direction; and
a coil wound around the teeth, wherein
when an angle between the teeth adjacent to each other is $\theta 1$ and an angle formed by the connecting members with respect to the axis is $\theta 2 > \frac{1}{2} \theta 1$ is satisfied.

* * * * *